H. S. KITTREDGE.
SIGNAL LAMP.
APPLICATION FILED JUNE 4, 1915.

1,240,458.

Patented Sept. 18, 1917.

Inventor
Harold S. Kittredge

UNITED STATES PATENT OFFICE.

HAROLD S. KITTREDGE, OF CHICAGO, ILLINOIS, ASSIGNOR OF ONE-HALF TO HOLTON A. ANDERSON, OF CHICAGO, ILLINOIS, AND ONE-HALF TO FREEMAN D. A. HUNTER, OF FORT WAYNE, INDIANA.

SIGNAL-LAMP.

1,240,458.   Specification of Letters Patent.   Patented Sept. 18, 1917.

Application filed June 4, 1915.   Serial No. 32,122.

*To all whom it may concern:*

Be it known that I, HAROLD S. KITTREDGE, a citizen of the United States, residing at Chicago, in the county of Cook and State of Illinois, have invented certain new and useful Improvements in Signal-Lamps, of which the following is a specification.

This invention relates to signal lamps used on motor vehicles to indicate the direction the car is about to turn, thus giving a warning to the driver of a car to the rear.

The invention has for its object to provide a novel and improved means for operating the lamps, the operation being automatically effected through a circuit-closing device actuated by the steering gear.

The object stated is attained by means of a combination and arrangement of parts to be hereinafter described and claimed reference being had to the accompanying drawing in which—

Figure 1:
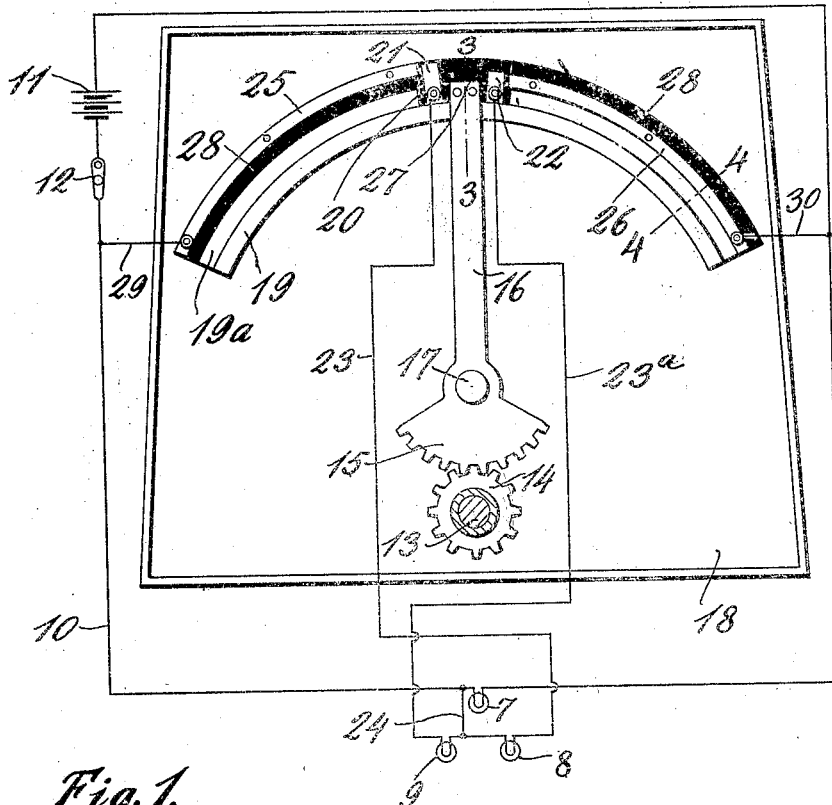
Figure 1 is a plan view of the device, partly diagrammatic.
Figure 2:
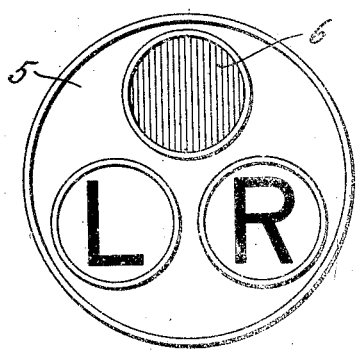
Fig. 2 is a face view of the lamp.
Figure 3:
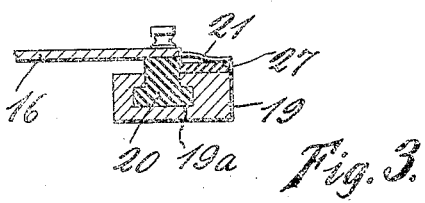
Figure 4:
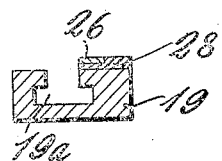

Figs. 3 and 4 are sectional details on the lines 3—3 and 4—4, respectively, of Fig. 1.

Referring specifically to the drawing, 5 denotes an automobile tail lamp divided into three sections, each section containing an electric lamp bulb, and having a distinctive face. The face of one section has a red lens 6 the same constituting a regulation danger signal as required by law. The lamp of this section is shown at 7. The other sections are below the first-mentioned section, on opposite sides of the vertical center line thereof, the lamps thereof being indicated at 8 and 9, respectively. The face of the section containing the lamp bulb 8 has the letter R, and the face of the section containing the lamp bulb 9 has the letter L. These letters become visible when the proper lamps are lighted, the letter R indicating that the car is about to turn to the right, and the letter L that the car is about to turn to the left.

The lamp 7 is in an electric circuit 10 including a suitable current source 11, and provided with a push button or other suitable switch 12. This switch will be closed after dark to turn on the lamp 7. The signal lamps 8 and 9 are automatically controlled by the steering gear of the car, so that when the said gear is operated to make a turn, the proper lamp will be lighted up to indicate the direction in which the car is about to turn. This controlling mechanism comprises the following parts:

On the steering post 13 of the car is fast a pinion 14 which meshes with a sector gear 15 on a lever 16 having pivotal support at 17. These parts are located beneath the floor of the car, and they are inclosed in a housing 18, the latter carrying the pivot 17. The housing also supports an arcuate guide strip 19 having an undercut channel 19$^a$ in which is slidably mounted a shoe 20 of insulating material carried by the outer end of the lever 16. The length of the guide strip corresponds to the length of the arc through which the end of the lever carrying the shoe swings. The shoe projects a short distanc from opposite sides of the lever and on each side of the latter carries a brush, one of the latter being shown at 21 and the other at 22. The brush 21 is connected to a conductor 23, and the brush 22 to a conductor 23$^a$. These conductors lead to the lamps 8 and 9, the conductor 23 being connected to the lamp 8 and the conductor 23$^a$ to the lamp 9. From both lamps a conductor 24 leads and is connected to one side of the circuit 10. On top of the guide 19 are two contact strips 25 and 26, respectively, which are separated midway between the ends of the guide by a block 27 of insulation. The contact strips are also insulated from the guide by a strip 28 of insulation. The strip 25 is connected by a conductor 29 to one side of the circuit 10, and a conductor 30 connects the strip 26 to the other side of said circuit.

When the brush 21 is on the strip 25 the circuit of the lamp 8 is closed. This circuit is from one side of the current source 11 by conductor 10 to conductor 24, through lamp 8, conductor 23, brush 21, contact 25, conductor 29, and back to the current source. When the brush 22 is on the contact 26 the circuit of the lamp 9 is closed, the circuit being from one side of the current source 11 to conductor 24, through lamp 9, conductor 23$^a$, brush 22, contact 26, conductor 30, and back to current source. When the brushes are both on the insulation 27 both lamp circuits are broken, the brushes being in this position when the steering post 13 is turned to hold the car straight ahead.

When the steering post is operated to make a turn to the right, the lever 16, through the gears 14 and 15, swings in a direction to bring the brush 21 in contact with the strip 25, whereupon the circuit of the lamp 8 is closed as hereinbefore described, and upon operating the steering post to make a turn to the left, the lever swings in a direction to bring the brush 22 in contact with the strip 26, whereupon the circuit of the lamp 9 is closed. When the steering post is again turned to hold the car straight ahead, the brushes swing over on the block 27 of insulation and the circuits of the lamps 8 and 9 remain open as long as the brushes are in this position. The lamps are therefore automatically controlled by the steering gear without disturbing the attention of the driver operating the car. When the brushes are in neutral position, they are close to the contact strips so that the lamp circuits will be instantly closed even if a short turn is made, as when passing a car ahead. The length of the contact strips and the ratio of the gears 14 and 15 are such that the brushes remain in contact with said strips up to the limit of the turning movement of the steering post.

It will be noted that the contact strips 25 and 26 are not in alinement, and the brush 22 is shorter than the brush 21, this arrangement being necessary in order that the brush 21 may not come in contact with the strip 26, and the brush 22 with the strip 25.

I claim:—

A circuit controller comprising a rotary element, a lever operatively connected to said element, brushes carried by the lever, contact strips for the respective brushes, said contact strips being separated endwise, a shoe carried by the lever, said shoe being of insulation and carrying the brushes, an arcuate guide having an undercut channel in which the shoe is slidably mounted, and an electric circuit controlled by the contact strips and the brushes.

In testimony whereof I affix my signature in presence of two witnesses.

HAROLD S. KITTREDGE.

Witnesses:
S. J. LEHRER,
H. G. BATCHELOR.